(Model.)

T. A. GALT & G. S. TRACY.
CORN PLANTER.

No. 259,679. Patented June 20, 1882.

2 Sheets—Sheet 1.

WITNESSES
Fred. G. Dieterich
H. Dieterich

INVENTORS
Thomas A. Galt
Geo. S. Tracy
per. Manahan & Ward, Attorneys (Model.)
T. A. GALT & G. S. TRACY.
CORN PLANTER.
No. 259,679. Patented June 20, 1882.
2 Sheets—Sheet 2.
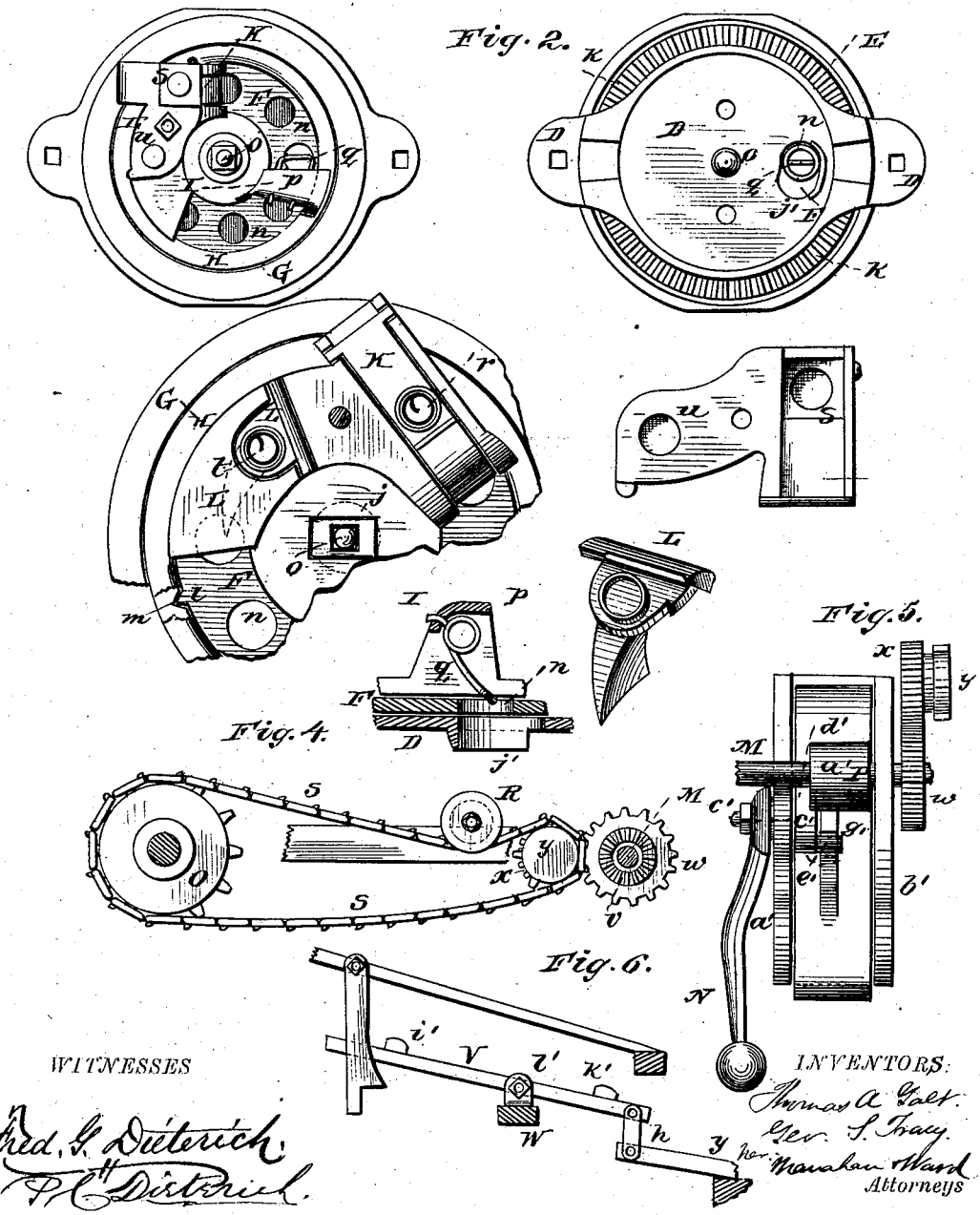

UNITED STATES PATENT OFFICE.

THOMAS A. GALT AND GEORGE S. TRACY, OF STERLING, ILLINOIS.

CORN-PLANTER.

SPECIFICATION forming part of Letters Patent No. 259,679, dated June 20, 1882.

Application filed December 10, 1881. (Model.)

*To all whom it may concern:*

Be it known that we, THOMAS A. GALT and GEORGE S. TRACY, citizens of the United States, residing at Sterling, in the county of Whiteside and State of Illinois, have invented certain new and useful Improvements in Corn-Planters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention is chiefly applicable to that class of corn-planters drawn by two horses, and which plant two rows of corn at one time, but can be used on machines planting one or more rows; and it consists essentially of certain novel and useful devices for measuring and discharging the seed, for regulating the depth of planting, and for controlling the operation of the machine.

One of the controlling ideas in our invention is that of automatically measuring the seed, one grain at a time, into a receptacle and discharging such seed from the latter by hand for check-rowing when a sufficient number of grains has been deposited therein.

Figure 1:
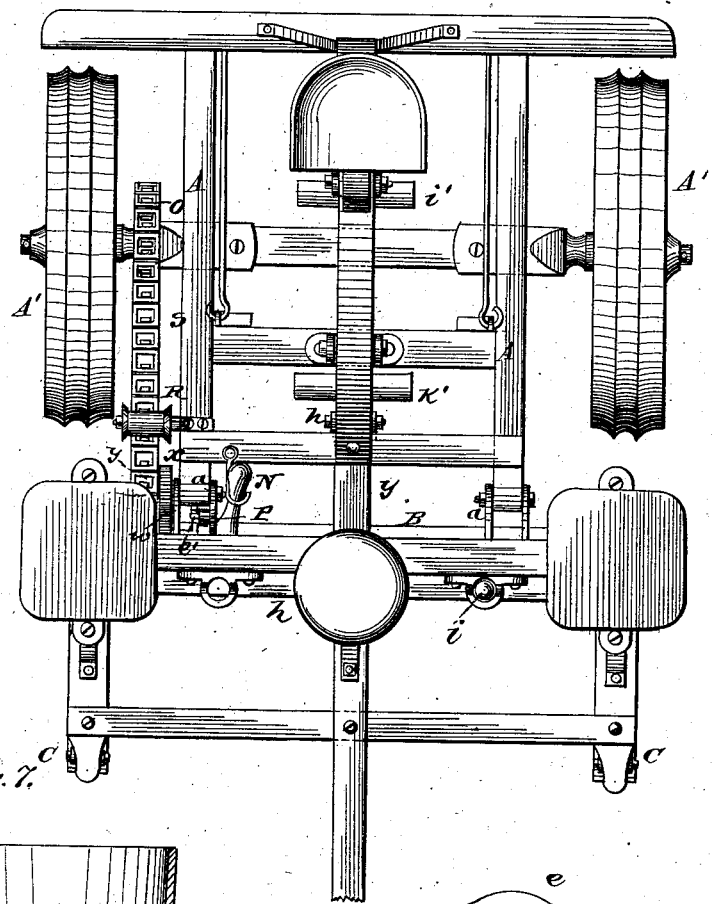
Figure 7:
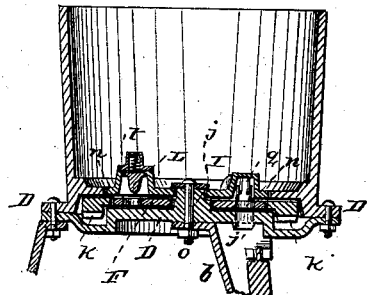
Figure 3:
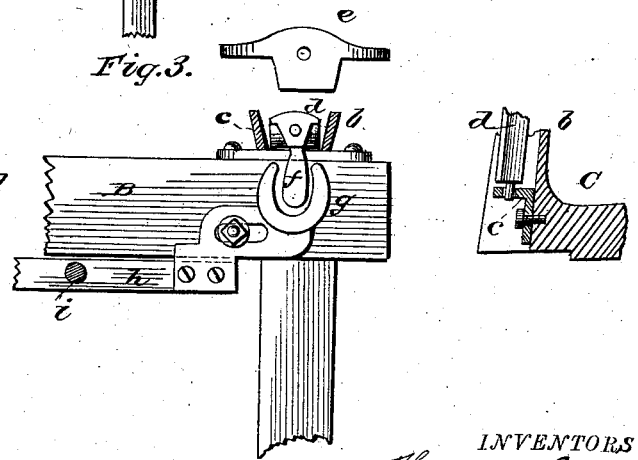

In the drawings, Figure 1 is a plan view of a machine embodying our invention. Fig. 2 is a detached view of the parts constituting the mechanism in the bottom of the grain-hopper for measuring and discharging the seed. Fig. 3 is a detached view of the shelf and vertical valve in the seed-tube, with the reciprocating bar and hand-lever which actuates said valve shown in their relative position. Fig. 4 is a detached view of the driving-gear, sprocket-chain, sprocket-pinion, and driving-shaft. Fig. 5 is an enlarged detached view of the devices used for throwing the machine in and out of gear. Fig. 6 is a detached view of the treadle-bar and forcing-lever. Fig. 7 is a vertical section of the hopper, dropping devices, &c.

A A are the side plates of the rear frame, pivotally attached by means of the open stirrups $a\ a$ to the rear cross-beam, B, of the front frame.

A' A' are the usual carrying-wheels.

C C are the runners or furrow-openers, in the rear of which respectively are formed the vertical seed-tubes $b\ b$.

In the seed-tube $b$, near the lower end thereof, is detachably affixed the shelf $c$, which is constituted of two sides at right angles with each other, through one of which sides a shaft is bolted to the front wall of the seed-tube $b$, and the other of such sides, then being horizontal, serves the double purpose of a support for the vertical valve $d$ and a shelf to retain the corn, if desired, in its passage from the seed-hopper to the ground. The vertical valve $d$ is journaled at its lower end in the shelf $c$, as aforesaid, and at its upper end in a cap, $e$, fastened in any suitable manner for that purpose to the upper end of the tube $b$. The vertical valve $d$ is shaped so as to furnish the back to and a vertical partition in the seed-tube $b$.

A short lever, $f$, projects forward from the valve $d$, near the upper end of the latter, which lever $f$ is engaged in rearward-extending horizontal clutch $g$ of the reciprocating bar $h$, which is actuated by the usual hand-lever, $i$, and which bar $h$, through the medium of the clutch $g$ and lever $f$, operates the valve $d$.

The valve $d$ at each action of the lever $i$, by means of its partition, sweeps the last previously-deposited amount of seed from the shelf $c$.

Referring to Fig. 2, D is a bed-plate, which is seated in the bottom of the grain-hopper as a basis for the measuring mechanism. In the center of the upper face of the plate D is formed the short vertical post $j$, as a pivot for the revolving seed-plate hereinafter named. Such plate D is also provided with the hole $j'$ to permit the passage of the seed from the seed-hopper into the seed-tube $b$.

E is a ring which carries the seed-plate, and which has formed on its lower face the bevel-gear $k$. The ring E fits down over the outside of the face of the plate D, the bevel-gear $k$ projecting below the face of the plate D.

F is an annular seed-plate, fitted loosely on the short post $j$ as its center of motion, and fitted within the ring E. Triangular projections $i\ i$ on the seed-plate F fit into and engage corresponding recesses, $m\ m$, on the inner circumference of the ring E to insure the rotation of the gear-ring E with the seed-plate F. The seed-plate F is furnished with such number of seed-cups n, each calculated to hold but one grain, as may be desired, and such seed-plate is made readily removable in order that other plates containing a greater or less number of seed-cups may be easily substituted.

Over the seed-plate F is placed the cap-plate G, which is fastened by means of lugs to the base-plate D, and which serves to hold the gear-ring E and seed-plate F in place.

H is an annular cut-off plate, which fits into the upper face of the cap-plate G, and is held in place by a mortise in its center, passing over a tenon in the top of the post j, and by means of a bolt, o, passing up through such post and having a nut on its upper end. The cut-off plate H is an iron ring encompassing the outside line of the circular series of seed-cups n of the plate F, and supporting the three devices of a seed-adjuster, a cut-off, and a seed ejector or discharger. I is the seed-adjuster, which consists of a bridge, p, placed near the edge of the cut-off plate H at a point nearly or quite opposite the discharge-hole j' of the plate D, and spans the line of the series of rotating seed-cups n. To the bench p there is attached in any suitable manner the spring q, constructed of a bent wire, having two open ends spirally attached to the bridge p, so as to hold the loop end of the spring q flat upon the top of the seed-plate F. The spring q stands diagonally forward in the direction of the rotation of the seed-plate F, so that in such rotation each seed-cup n passes under the spring q prior to reaching the cut-off. In this process the operation of the adjuster I is to give a sloping yielding stroke over each succeeding seed-cup n, thus adjusting the kernel of corn therein so that the cut-off will readily keep back the surplus grains, leaving the single kernel which has been adjusted in the seed-cup to pass under and be discharged.

K is an adjustable cut-off, axled at its rear end, and held adjustably to the upper face of the seed-plate F by a spiral spring, r, seated in the closed chamber s, directly over the cut-off.

L is the seed ejector or discharger, and consists of a triangular piece of metal so axled on the plate H as that one of its angles shall enter each succeeding seed-cup n at the precise time when such seed-cup is directly over the discharge-hole j' of the plate D, being forced down into such seed-cup by a spiral spring, t, seated in the closed chamber u on the upper side of the discharger L.

The purpose of the discharger L is to secure uniformity of dropping by preventing any kernel from remaining in the seed-cup n beyond the point of discharge. The spring t forces the adjuster L into each seed-cup, thus insuring certain discharge of the seed from each seed-cup when the latter is over the seed-tube b and the hole j' communicating therewith. By reason of the sloping front of the discharger L it is raised out of each seed-cup by the rear wall thereof in the rotation of the seed-plate F. Thus in this part of our machine the adjuster I adjusts the grain in each seed-cup, the cut-off K excludes all other seeds, and when the seed-cup thus filled passes around to the point of discharge from the hopper the discharger L there insures the egress of the seed.

The ring E and seed-plate F are revolved continuously by means of a transverse shaft, M, journaled on the upper side of and parallel with the cross-beam B, on each end of which shaft is a bevel-pinion, v, which engages the bevel-gear k of the ring E. The shaft M is driven by means of a pinion, w, affixed thereon, which engages and is driven by a like pinion, x. The pinion x and a sprocket-pinion, y, are rigidly fixed upon the same axle, journaled on the outside and laterally through the front end of the right side plate, A, of the rear frame.

A sprocket-chain, S, passes around the sprocket-pinion y and around a sprocket drive-gear, O, rigidly affixed to the inner end of the hub of the right carrying-wheel, A'. Thus by means of the inter-related mechanism aforesaid there is imparted to the seed-plate F a continuous revolution, which causes the latter to deposit automatically the contents of each succeeding seed-cup n through the hole j' into the seed-tube b and upon the shelf c therein, from whence such seed is discharged at the will of the operator by actuating the valve d by means of the hand-lever i.

It will be observed that the apparatus before described for dropping the seed from the shelf c in the seed-tube b to the ground—to wit, the lever i, valve d, shelf c, and reciprocating bar h—have no connection with the operation of the devices in the bottom of the hopper for measuring the quantity of seed.

It is designed that each seed-cup n shall be made to hold but one kernel of corn (that being the best if not the only mode of obtaining uniformity and accuracy in number of kernels to be deposited in each hill) and that the number of seed-cups n in the seed-plate F shall be such that any desired number of kernels may be successively dropped into the tube b upon the shelf c while the machine is moving the distance between the check or cross rows, or the distance it is desired to plant the hills apart, at which intervals the accumulated kernels in the seed-tube b are discharged to the ground. Thus, if four kernels are desired in each hill, and the latter are four feet apart, a seed-plate will be used in which the seed-cups are at such intervals that four seed-cups will discharge each one kernel into the seed-tube b while the planter moves lineally four feet.

If it is desired to drill the seed, the shelf c and valve d can be removed by unscrewing the former from the seed-tube, when each grain will drop directly through the seed-tube b to the ground coincident with its discharge by each seed-cup n from the hopper.

In Fig. 5 are shown the pinion $x$ and its companion, the sprocket-pinion $y$, and their relations to the shaft M and its pinion $w$. The bearing $a'$ of the shaft M is placed in ways $b'$, so as to permit of sufficient lateral movement of such shaft to engage and disengage the pinions $x$ and $w$. A lever, N, is rigidly attached to a short axle, $c'$, which is journaled laterally through the side of the stirrup $a$.

To the end of the axle $c'$ opposite to that at which the lever N is attached, is rigidly affixed an eccentric head, $d'$, in which is fastened exteriorly the horizontal wrist-pin $e'$. A sleeve, P, is placed around the axle M, just inside of the pinion $w$, and projected rearward far enough to admit of the formation of the recess or bed $g'$ therein to receive the wrist-pin $e'$. When the lever N is thrown forward it partially rotates the top of the axle $c'$ in the same direction, and the wrist-pin $e'$, being placed in the upper portion of the head $d'$, also moves forward. By reason of the pin $e'$ resting in the bed $g'$ of the sleeve P the axle M is thrown sufficiently forward to disengage the pinion $w$ from the pinion $x$ and throw the planter out of gear. A reverse movement of the lever N will of course throw the machine into gear. The upper end of the lever N is made so heavy that by its own gravity it will remain either forward or back, as placed.

R is a traveling pulley or idler seated in a vertical slot, intended to tighten and guide the sprocket-chain S.

V is a short longitudinal lever, fulcrumed on the cross-beam W, (which extends across the rear frame in front of the axle of the carrying-wheels,) and has its front end attached pivotally, by a short vertical stirrup, $h$, to the rear end or extension of the tongue Y. On the lever V are placed the transverse treadle-bars $i'$ and $k'$, the first being behind the fulcrum $l'$ of the lever V and the last in front of such fulcrum. Both of the treadles $i$ and $k'$ are within convenient reach of the driver's seat, and by the driver pressing his foot on the treadle-bar $i'$ the rear end of the front frame is raised, and with it the seeding mechanism. By pressing on the treadle-bar $k'$ a contrary result is produced and the furrow-openers C C pushed more deeply into the ground. When the front frame is lifted or lowered it changes its distance from the rear frame. This has been provided for heretofore by putting a slot in the end of the lifting-lever. Our stirrup $h$ permits the interval between the frames to be changed, and without the friction of the slot.

Having described our invention, what we claim therein, and desire to secure by Letters Patent of the United States, is—

1. The combination of the base-plate D, ring E, having the gear $k$, seed-plate F, cap-plate G, and the cut-off plate H, provided with the adjuster I, cut-off K, and discharger L, the latter being adapted to be operated by said seed-plate, substantially as and for the purpose described.

2. The combination of the seed-plate F, the cut-off plate H, the adjuster I, the cut-off K, and the discharger L, the seed-plate being both acted upon and actuating said discharger, substantially as and for the purpose specified.

3. The combination of the hand-lever $i$, reciprocating bar $h$, provided with the clutch $g$, the valve $d$, provided with the horizontal lever $f$, and the tube $b$, having the shelf $c$, in the manner substantially as shown, and for the purpose described.

4. The combination of the sleeve P, provided with the recess $g'$, axle M, head $d'$, provided with the wrist-pin $e'$, axle $c'$, and lever N, constructed and operating together, substantially as shown, and for the purpose mentioned.

In testimony whereof we affix our signatures in presence of two witnesses.

THOMAS A. GALT.
GEO. S. TRACY.

Witnesses:
JAS. B. PATTERSON,
H. PARKER.